(12) United States Patent
Leroy et al.

(10) Patent No.: US 11,548,561 B2
(45) Date of Patent: Jan. 10, 2023

(54) PROFILE FOR A STRUCTURAL BEAM OF A VEHICLE

(71) Applicant: AUTOTECH ENGINEERING, S.L., Amorebieta-Etxano (ES)

(72) Inventors: Emmanuel Leroy, Amorebieta-Etxano (ES); Matthieu Niess, Amorebieta-Etxano (ES); Kira Masaki Gosa, Amorebieta-Etxano (ES)

(73) Assignee: AUTOTECH ENGINEERING, S.L., Amorebieta-Etxano (ES)

( * ) Notice: Subject to any disclaimer, the term of this patent is extended or adjusted under 35 U.S.C. 154(b) by 0 days.

(21) Appl. No.: 17/281,747

(22) PCT Filed: Oct. 15, 2019

(86) PCT No.: PCT/EP2019/078012
§ 371 (c)(1),
(2) Date: Mar. 31, 2021

(87) PCT Pub. No.: WO2020/079027
PCT Pub. Date: Apr. 23, 2020

(65) Prior Publication Data
US 2021/0387676 A1    Dec. 16, 2021

(30) Foreign Application Priority Data
Oct. 15, 2018   (EP) .................... 18382734

(51) Int. Cl.
*B62D 25/00*   (2006.01)
*B62D 25/04*   (2006.01)
(Continued)

(52) U.S. Cl.
CPC ............. *B62D 25/04* (2013.01); *B62D 25/00* (2013.01); *B62D 29/001* (2013.01); *B62D 21/157* (2013.01)

(58) Field of Classification Search
CPC .... B62D 25/04; B62D 29/001; B62D 29/007; B62D 21/157; B62D 21/00; B62D 25/00
(Continued)

(56) References Cited

U.S. PATENT DOCUMENTS 9,849,916 B2    12/2017 Valencia Carrio et al.
2012/0319431 A1  12/2012 Bodin et al.

FOREIGN PATENT DOCUMENTS

DE          3928869    *  3/1990 ........... B62D 21/157
DE     102014112740 A1    3/2016
(Continued)

OTHER PUBLICATIONS

International Search Report dated Jan. 13, 2020 re: Application No. PCT/EP2019/078012, pp. 1-4, citing: EP 2 541 093 A1, JP 2004 114912 A, EP 3 342 684 A1, EP 2 610 355 A1. WP 2018/174082 A1, WO 2016/046228 A1 and DE 10 2016 103962 B3.

(Continued)

*Primary Examiner* — Dennis H Pedder
(74) *Attorney, Agent, or Firm* — Cantor Colburn LLP

(57) ABSTRACT

A profile includes two end wing portions with substantially a transversal direction (Y), two lateral wall portions having substantially a height direction-(Z), a frontal wall portion having substantially a transversal direction (Y), two curved transition zones (R1, R2) disposed between the lateral wall portions and the frontal wall portion, and two curved transition zones (R3, R4) disposed between the end wing portions and the lateral wall portions. A specific portion of each curved transition zones (R1, R2) between the lateral wall portions and the frontal wall portion has a tensile strength lower than the tensile strength of the rest of the cross-section. This configuration also relates to a longitudinal beam, a cross-member, a pillar, a B-Pillar or a C-Pillar having the profile, and to a vehicle provided thereof.

11 Claims, 12 Drawing Sheets

(51) Int. Cl.
    *B62D 29/00*     (2006.01)
    *B62D 21/15*     (2006.01)

(58) Field of Classification Search
    USPC .......................................... 296/193.06, 209
    See application file for complete search history.

(56) References Cited

FOREIGN PATENT DOCUMENTS

| | | |
|---|---|---|
| DE | 102016103962 B3 | 3/2017 |
| EP | 2209696 A1 | 7/2010 |
| EP | 2541093 A1 | 1/2013 |
| EP | 2610355 A1 | 7/2013 |
| EP | 3342684 A1 | 7/2018 |
| JP | 2004114912 A | 4/2004 |
| WO | 2009064236 A1 | 5/2009 |
| WO | 2015071412 A1 | 5/2015 |
| WO | 2015071444 A2 | 5/2015 |
| WO | 2016046228 A1 | 3/2016 |
| WO | 2018174082 A1 | 9/2018 |

OTHER PUBLICATIONS

Written Opinion dated Jan. 13, 2020 re: Application No. PCT/EP2019/078012, pp. 1-6, citing: EP 2 541 093 A1, JP 2004 114912 A, EP 3 342 684 A1, EP 2 610 355 A1. WP 2018/174082 A1, WO 2016/046228 A1 and DE 10 2016 103962 B3.

* cited by examiner

Hat profile length in section: 276,5mm

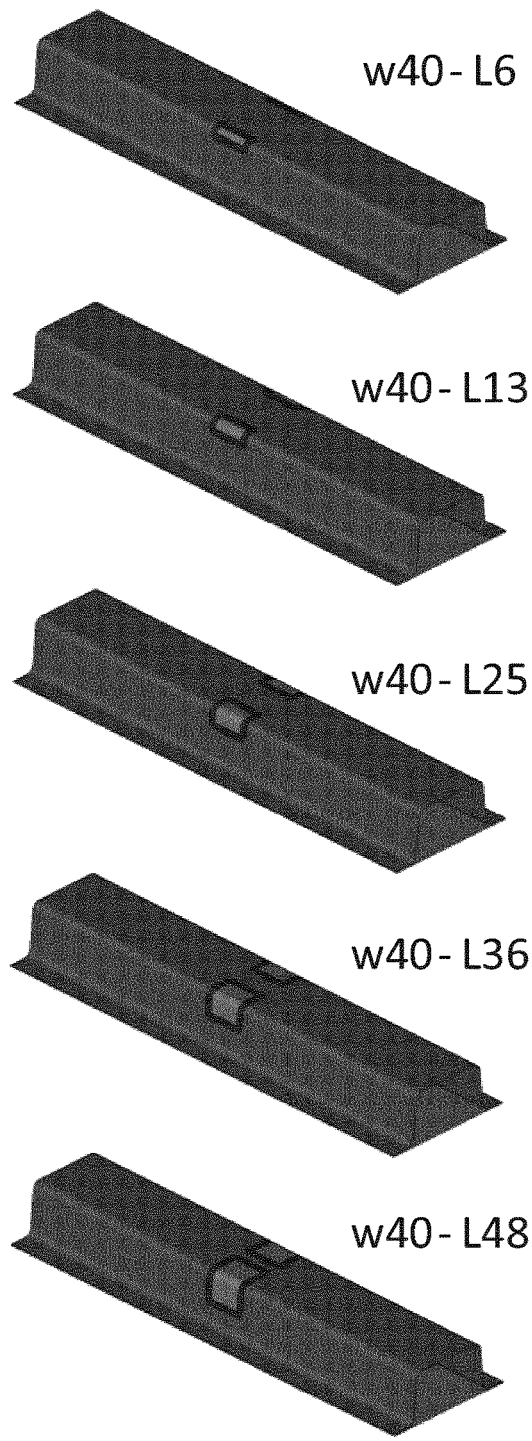 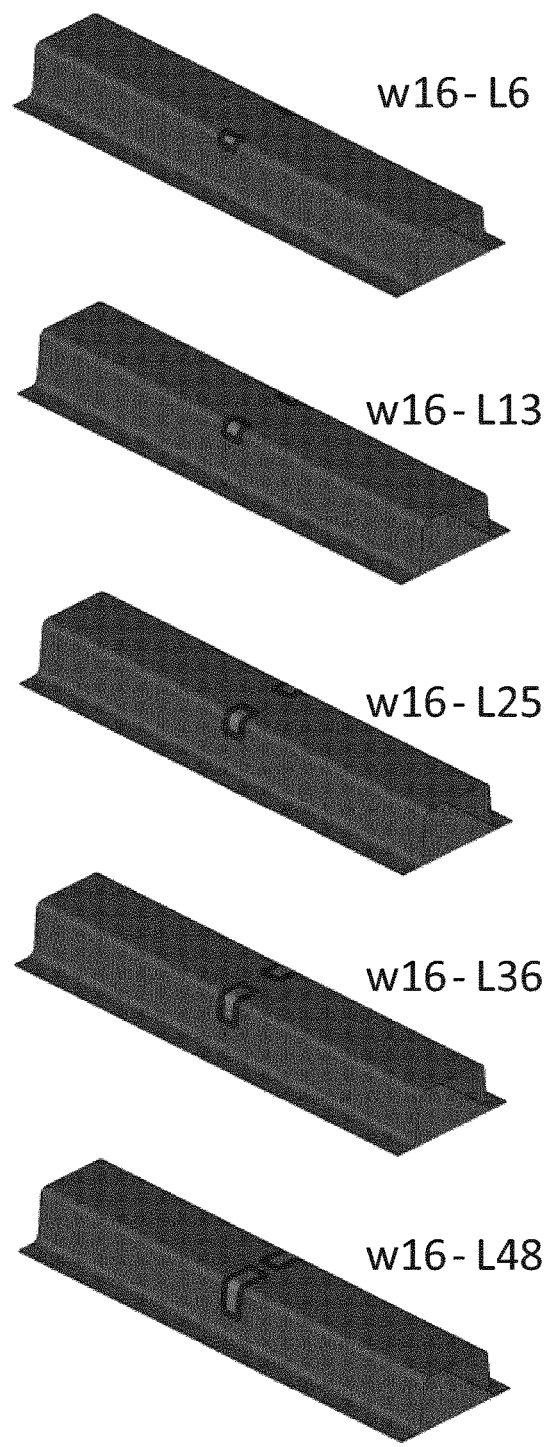
FIG. 9a  FIG. 9b

PROFILE FOR A STRUCTURAL BEAM OF A VEHICLE

TECHNICAL FIELD

This disclosure is related to the field of structural beams used in automotive vehicles, and more specifically, to B-pillars, Rocker beams, C-pillars or front rails used in body in white structures.

BACKGROUND

Structural beams have undergone a great development. Constant evolving regulations in matter of impact tests and new treatments for ultra-high strength steels (UHSS) have given as a result a continuous improvement in these elements.

Some of these structural beams have a particular shape considering the function they perform in a particular location in the body in white structure. Pillars do not usually have exactly the same cross-section as longitudinal beams or cross-members. It can be assumed that Ω-shaped cross-section are representative to any Body-In-White (BIW) component that can be subject to this disclosure (longitudinals, cross-members and pillars).

B-pillars generally consist of a deformed blank resulting in an outer profile, destined, among others, to withstand lateral impacts. A back cover is added to the outer profile, so that a section with high inertia is acquired. In particular, as shown for example in FIG. 1, in the profile a longitudinal direction, a transversal direction and a height direction are defined, the directions being perpendicular therebetween. In case of a B-pillar, when fixed to the body of the vehicle, the longitudinal direction (X) will substantially coincide with the vertical direction, the transversal direction (Y) will coincide with the longitudinal direction of the car and the height direction (Z) will coincide with the transversal direction of the car, which is the direction of a lateral impact.

This outer profile has a Ω-shaped cross-section, such that therein are defined:
- two end wing portions having substantially the transversal direction;
- two lateral wall portions having substantially the height direction;
- a frontal wall portion having substantially the transversal direction;
- two curved transition zones between the lateral wall portions and the frontal wall portion; and
- two curved transition zones between the end wing portions and the lateral wall portions.

B-pillars have some very specific requirements, since they must provide strength and protection for the occupants of a vehicle in the event of a lateral impact, but at the same time they must be ductile enough so that they localize the deformation in specific area to absorb energy and do not let the vehicle occupant vital areas been injured by component uncontrolled collapse.

Many different designs try to fit these requirements, like for example as the B-pillars disclosed in WO 2015/071412 A1, WO 2015/071444 or U.S. Pat. No. 9,849,916.

In some designs, a band of a softer material is used in the lower portion of these B-pillars to enable this deformation localization, for example as taught in EP 2 209 696 B1, US 2012/0319431 A1 or DE 10 2014 112 740 A1.

EP 2541093 A1, JP 2004114912 A, EP 3342684 A1, EP 2610355 A1, WO 2018/174982 A1, WO 2016/046228 A1 and DE 102016103962 B3 are further examples of the background art.

The problem is that the weakened area implies a lower strength and energy absorption of the component, which implies having to give more thickness and resistance to the rest, which in turn leads to an increase in weight.

This is enough for current regulations, but it involves some disadvantages in terms of weight and behaviour.

SUMMARY

For overcoming the mentioned drawbacks and achieve the aforementioned aims, the present disclosure proposes a profile where a longitudinal direction, a transversal direction and a height direction are defined, the directions being perpendicular therebetween, the profile having a Ω-shaped cross-section, such that therein are defined:
- two end wing portions having substantially the transversal direction;
- two lateral wall portions having substantially the height direction;
- a frontal wall portion having substantially the transversal direction;
- two curved transition zones between the lateral wall portions and the frontal wall portion;
- two curved transition zones between the end wing portions and the lateral wall portions;

wherein a specific portion of each curved transition zones between the lateral wall portions and the frontal wall portion have a tensile strength lower than the tensile strength of the rest of the cross-section.

With the features of the disclosure, the disadvantages of prior art solutions can be overcome, since, on the one hand, the structural features of a structural beam of a vehicle, such as BIW longitudinal beam, crossmembers, or pillars, remain practically unchanged while guaranteeing on the other hand a minimum damage risk in case of lateral impact.

This is due to the fact that areas with a greater degree of ductility are made to coincide with zones more prone to rupture and rupture propagation, then guaranteeing that the profile will ve a plastic behavior in case of localized deformations (induced by lateral impact in case of a B-Pillar).

In some embodiments, the portions sum up a cross-section length l such that:

$$0.07 \cdot l \leq l1 + l2 \leq 0.26 \cdot l$$

$$0.03 \cdot l \leq l1$$

$$0.03 \cdot l \leq l2$$

l1 and l2 being the length of the specific portions.

This selection of values ensure that the damage risk will be kept under 70%, the percentage being calculated with respect to an interval comprised between the damage risk corresponding to a profile showing no risks of cracks (corresponding to 0% damage risk) and a profile showing cracks appearance (corresponding to 100% damage risk in the area of the crack).

In some embodiments, the length of the specific portions (l1, l2) satisfy:

$$0.12 \times l \leq l1 + l2 \leq 0.14 \cdot l$$

$$0.06 \cdot l \leq l1$$

$$0.061 \cdot l \leq l2$$

This particular selection of percentage of length of the curved sections with center of curvature inside the profile corresponds to a point of minimum damage risk.

In some embodiments, the specific portions have a tensile strength lower than 800 MPa and the rest of the cross-section has a tensile between 950 MPa and 1200 MPa.

In some embodiments, the length w of the specific portions in the longitudinal direction (X) are comprised between 10 and 150 mm.

In some embodiments, lower tensile strength of the specific portions (l1, l2) is obtained with a laser treatment.

In some embodiments, the specific zones comprise more than 50% bainite and the rest of the zones comprise more than 50% martensite.

The disclosure also relates to longitudinal beams (as front side rails or rear side rails) for a vehicle comprising a profile according to any of the previous variants.

The disclosure also relates to crossmembers (as seat crossmembers) for a vehicle comprising a profile according to any of the previous variants.

The disclosure also relates to a pillars (as B-Pillar or A-Pillar) fora vehicle comprising a profile according to any of the previous variants. In some embodiments, the B-pillar comprises a lower end destined to be attached to a rocker and an upper end destined to be attached to an A-pillar such that a B-pillar height is defined between the lower end and the upper end, the specific portion being located in lower half (vertically) of the B-Pillar, and more preferably between 1% and 15% of the B-pillar height and even more preferably between 2% and 10%.

In some embodiments, the B-pillar further comprises a press hardened patch (it includes a reinforcement welded to the main part before the stamping).

In some embodiments, the patch is made of a composite material.

In some embodiments, the reinforcement patch does not cover a portion of the B-pillar which is comprised between the lower end and a protection limit located at a second distance from the lower end, the second distance being comprised between 10% and 40% of the distance between the upper end and the lower end, and preferably between 20% and 30% of the distance between the upper end and the lower end.

Finally, the disclosure relates to a vehicle comprising a longitudinal beam, a cross-member or a pillar according to any of the previous variants.

BRIEF DESCRIPTION OF THE DRAWINGS

To complete the description and in order to provide a better understanding of the disclosure, a set of drawings is provided. Said drawings form an integral part of the description and illustrate embodiments of the disclosure, which should not be interpreted as restricting the scope of the disclosure, but just as an example of how the disclosure can be carried out. The drawings comprise the following figures:

FIG. 9a shows in perspective many profiles having two soft zones having a constant width, but a different length percentage.

FIG. 9b is analogous to FIG. 9a, but the width is narrower.

DETAILED DESCRIPTION OF THE DRAWINGS

Figure 1:
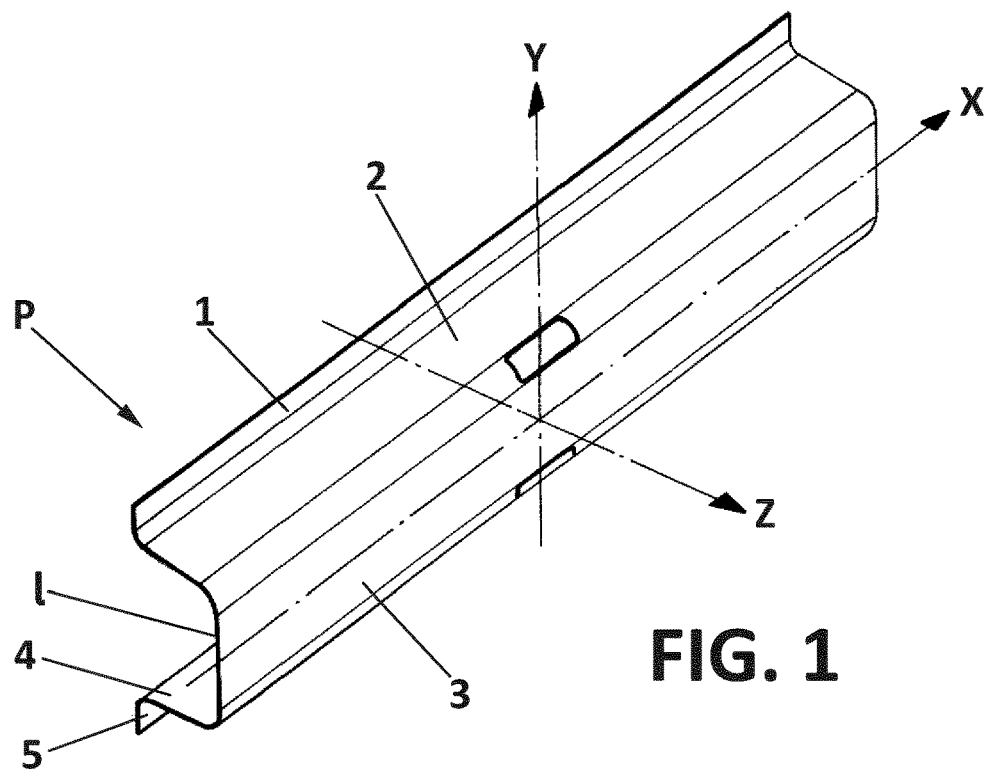
FIG. 1 shows a schematic perspective view of a profile according to the disclosure, where the softened zones are highlighted.
Figure 2:
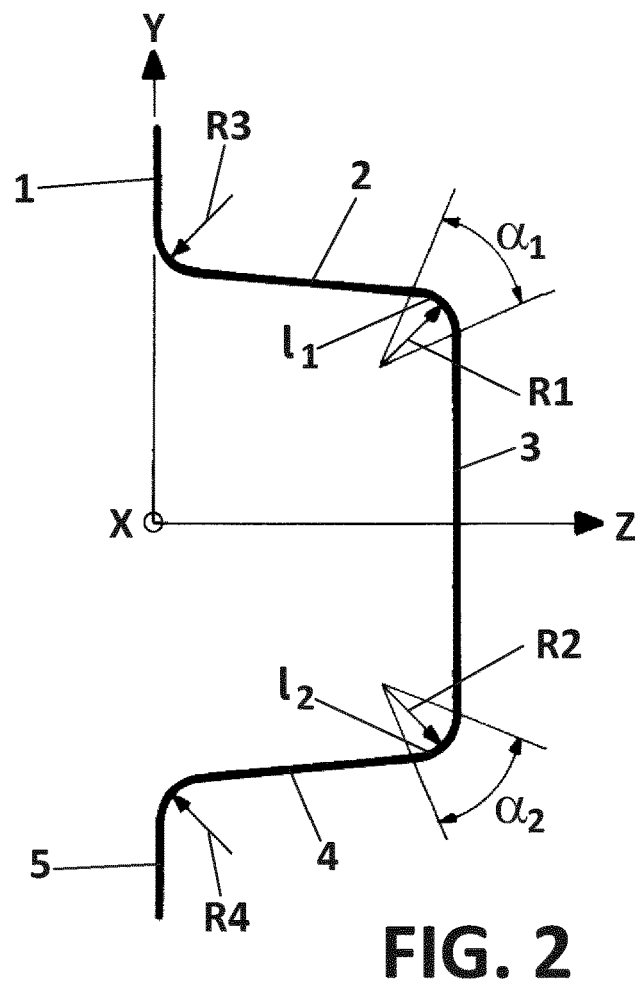
FIG. 2 shows a section of the profile and the geometric parameters used to define it.

As shown in FIGS. 1 and 2, the disclosure relates generally to a profile P where a longitudinal direction X, a transversal direction Y and a height direction Z are defined. These directions X, Y, Z are perpendicular therebetween and will be used to describe the different parameters of the disclosure.

As shown, the profile P has a Q-shaped cross-section, such that therein are defined:

two end wing portions 1, 5 having substantially the transversal direction Y; these end wing portions are destined to partially define the frame for the doors and for the union of the inner cover 6;

two lateral wall portions 2, 4 having substantially the height direction Z, which is the impact direction;

a frontal wall portion 3 having substantially the transversal direction Y;

two curved transition zones R1, R2 between the lateral wall portions 2, 4 and the frontal wall portion 3;

two curved transition zones R3, R4 between the end wing portions 1, 5 and the lateral wall portions 2, 4.

Figure 8A:
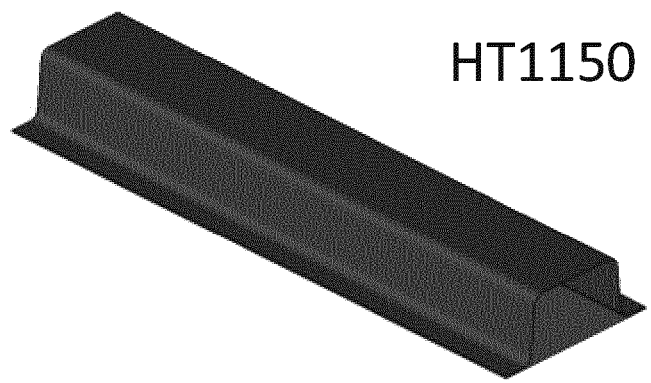
FIG. 8a shows a prior art homogeneous profile.

According to known embodiments of longitudinal rails, cross-members and pillars, these are made homogeneous with a high-strength steel, as illustrated for example in FIG. 8a.

One of the main functions of the B-pillar is to present resistance against a lateral impact, which will generally take place in its lower section.

Figure 4:
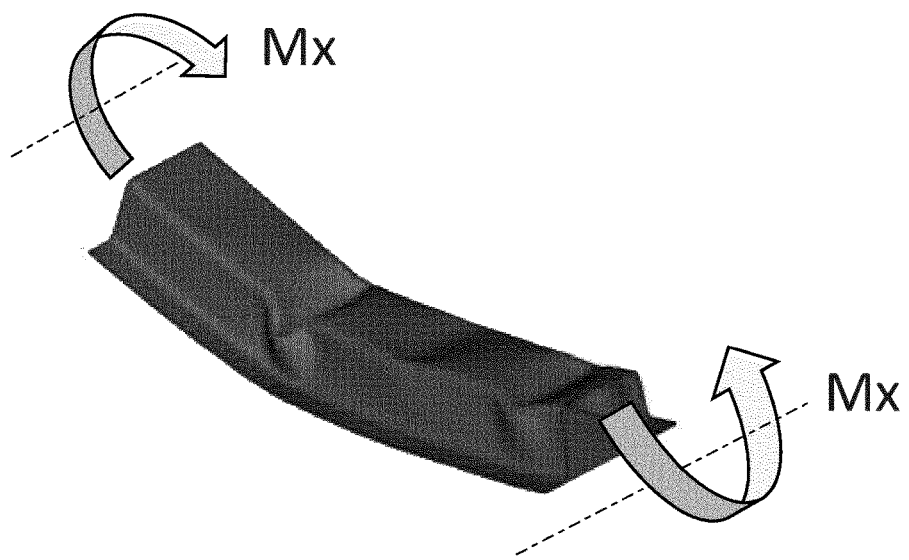
FIG. 4 shows the torque to which the profile is subjected during the simulations, which is the result of the four point bending configuration shown in FIG. 5.

In the course of a lateral impact, the B-pillar is subjected to forces which cause it to deform in an equivalent manner to how it would be deformed in the event of a bending moment Mx being applied as illustrated in FIG. 4.

Figure 5A:
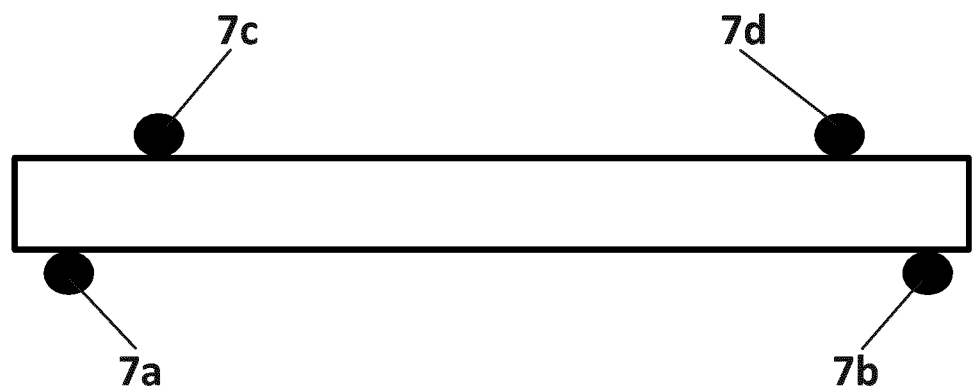
FIG. 5a shows the four point bending configuration, where the black dots represent the force application points
Figure 5B:
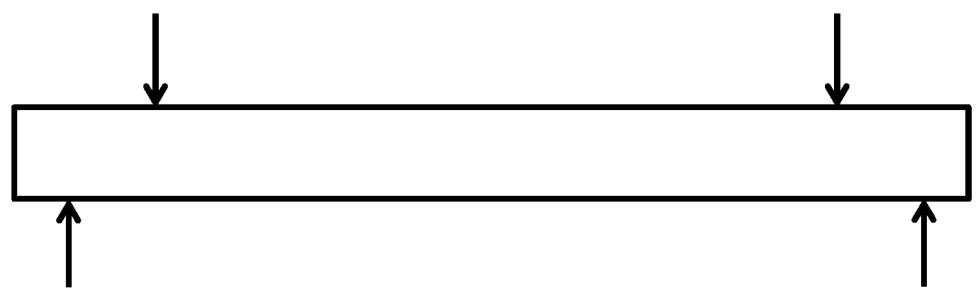
FIG. 5b represents the resulting forces.

This bending moment Mx can be obtained in turn by a fourth point test, as illustrated in FIGS. 5a and 5b, so that at the lower end points 7a and 7b, forces directed upwards are applied to the profile and forces directed downwards are applied at the upper end points 7c and 7d.

Figure 3:
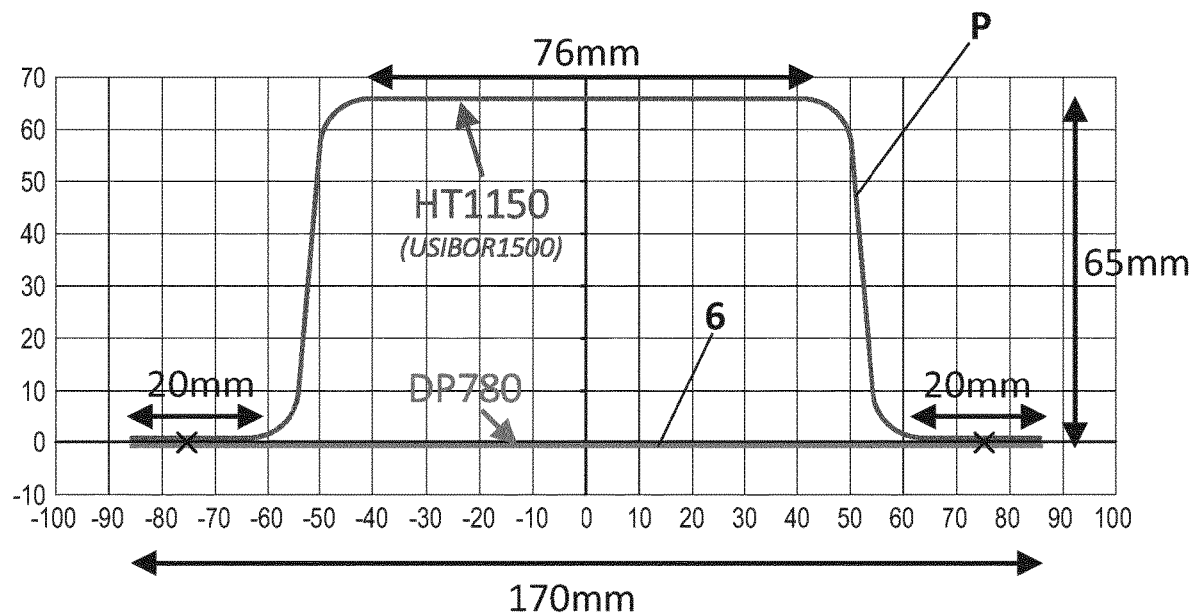
FIG. 3 shows the dimensions of the omega-shaped section of the profile used in simulations carried out to demonstrate the effects of the disclosure.

The simulations have been carried out with the dimensions and materials shown in FIG. 3, which are representative of regular sections of B-pillar, longitudinal and cross-member for a vehicle.

The simulation results are expressed in terms of maximum bending force (kN), which in turn is related with the energy absorption capacity of the component, and in terms of plastic strain and damage risk.

The damage risk, in percentage, is related to risk of having a crack appearance somewhere in the profile, 100% corresponding to a crack that occurred, 0% corresponding to no risk at all to see a crack.

Figure 12:
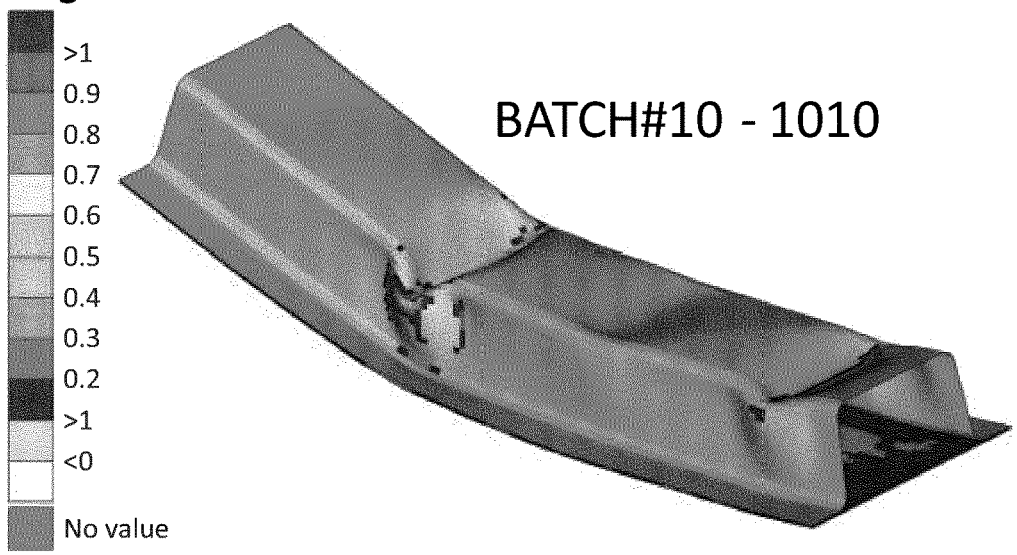
FIG. 12 shows the result of a 4 point bending simulation, which yields the damage risk in the profile.
Figure 13A:
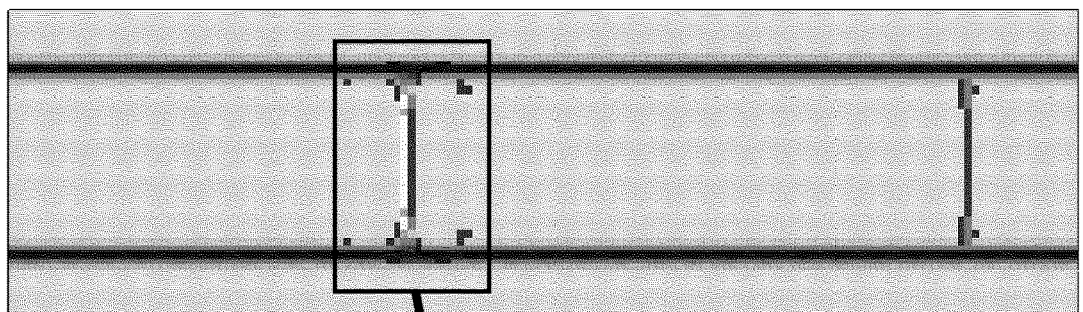
FIGS. 13a and 13b show plan views of the profile and the spatial distribution of the damage risks.
Figure 13B:
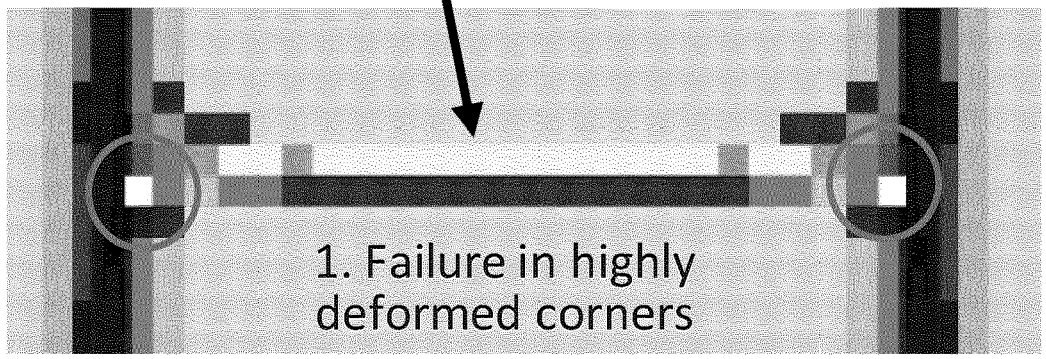

FIGS. 12, 13a and 13b are intended to demonstrate the need for a solution to the high risk of damage obtained in a profile of high strength, ie a monolithic beam made with the hardest material, i.e., less ductile.

Said profile was subjected, by simulation, to the four-point test. As can be seen in FIG. 13a, and in the extension of the area of interest of FIG. 13b, the highest damage risk occurs in the curved geometric transition zones (indicated R1 and R2 in FIG. 2), i.e. the curved areas whose center of curvature is located inside the profile.

The highest damage risk indicates the points at which the rupture will occur before, that is to say, points that will cease, during the impact but after the rupture, to absorb energy by plastic deformation.

Prior to carrying out these tests, a known solution for preventing premature ruptures of the profile during the impact and ensuring that the impact zone would not cease to absorb energy was to provide a soft zone band in the portion of the profile directly subjected to the impact. By providing such band, the plastic deformation was guaranteed, and the rest of the profile would not be affected, and would still exhibit a high resistance for the other structural functions.

Figure 8B:
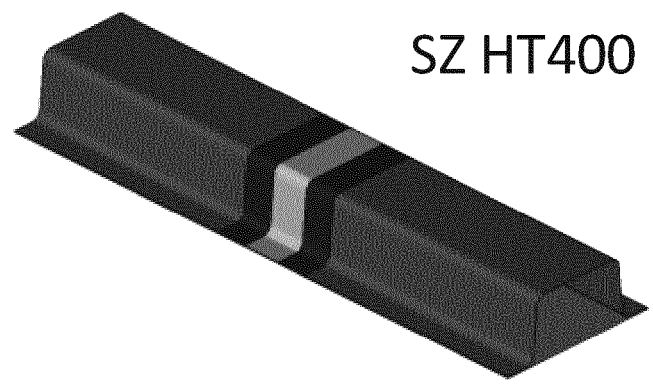
FIGS. 8b and 8c show prior art profiles where the 100% of the profile section has been softened at a determined portion of the profile, the softened band of the FIG. 8b profile being narrower than the band of the FIG. 8c profile.
Figure 8C:
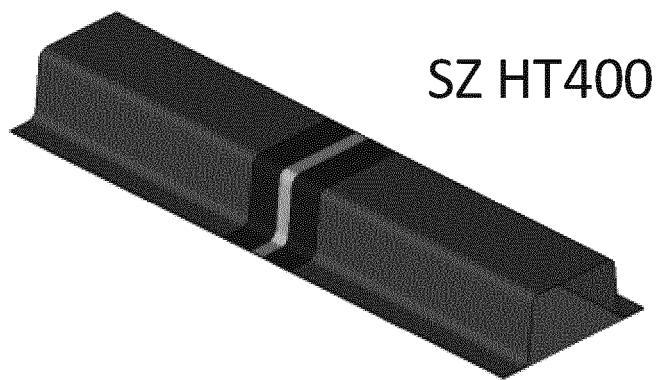

Examples of this prior art profiles are shown in FIGS. 8b and 8c.

However, the new tests have shown that the high stress points are highly localized, specifically in the curved zones having the center of curvature inside the profile, or said in other words, in the transition zones.

Figure 6:
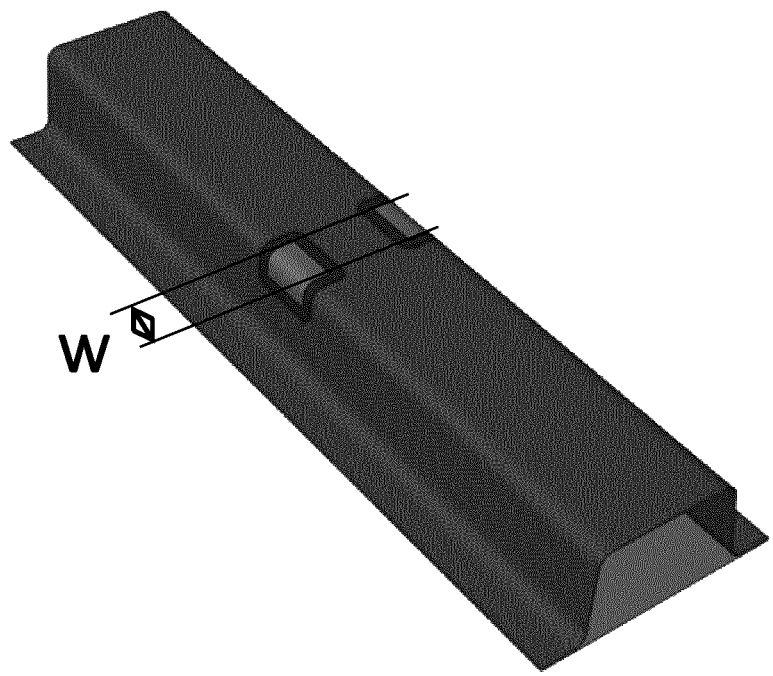
FIG. 6 is a perspective view of the profile, where the width of the softened curved zones are highlighted.

For this reason, according to the present disclosure, and as shown in FIGS. 1, 2 and 6, a specific portion 11, 12 of each curved transition zones R1, R2 between the lateral wall portions 2, 4 and the frontal wall portion 3 have a tensile strength lower than the tensile strength lower of the rest of the cross-section.

As will be demonstrated below, by means of these localized soft zones, the profile (B-pillar in the illustrated embodiment) is only slightly modified, thus guaranteing a good plastic behavior while maintaining its structural performance under normal conditions, that is, in non-impact conditions.

In particular, to evaluate the effect of the disclosure, simulations have been carried out for various combinations of the dimensions of the soft zone zones located in the said transition curves, as well as depending on the degree of ductility of the soft zone areas.

In particular, tests have been carried out for different lengths (L1 and L2) of the zones, maintaining the dimension W according to the X direction of said zones, as illustrated in FIG. 9a. The effect of the length has also been evaluated, comparing the results obtained for the profiles according to the disclosure of FIG. 9a with the profiles according to the disclosure of FIG. 9b, in which the soft zone zones have a shorter length according to the X direction.

Figure 10:
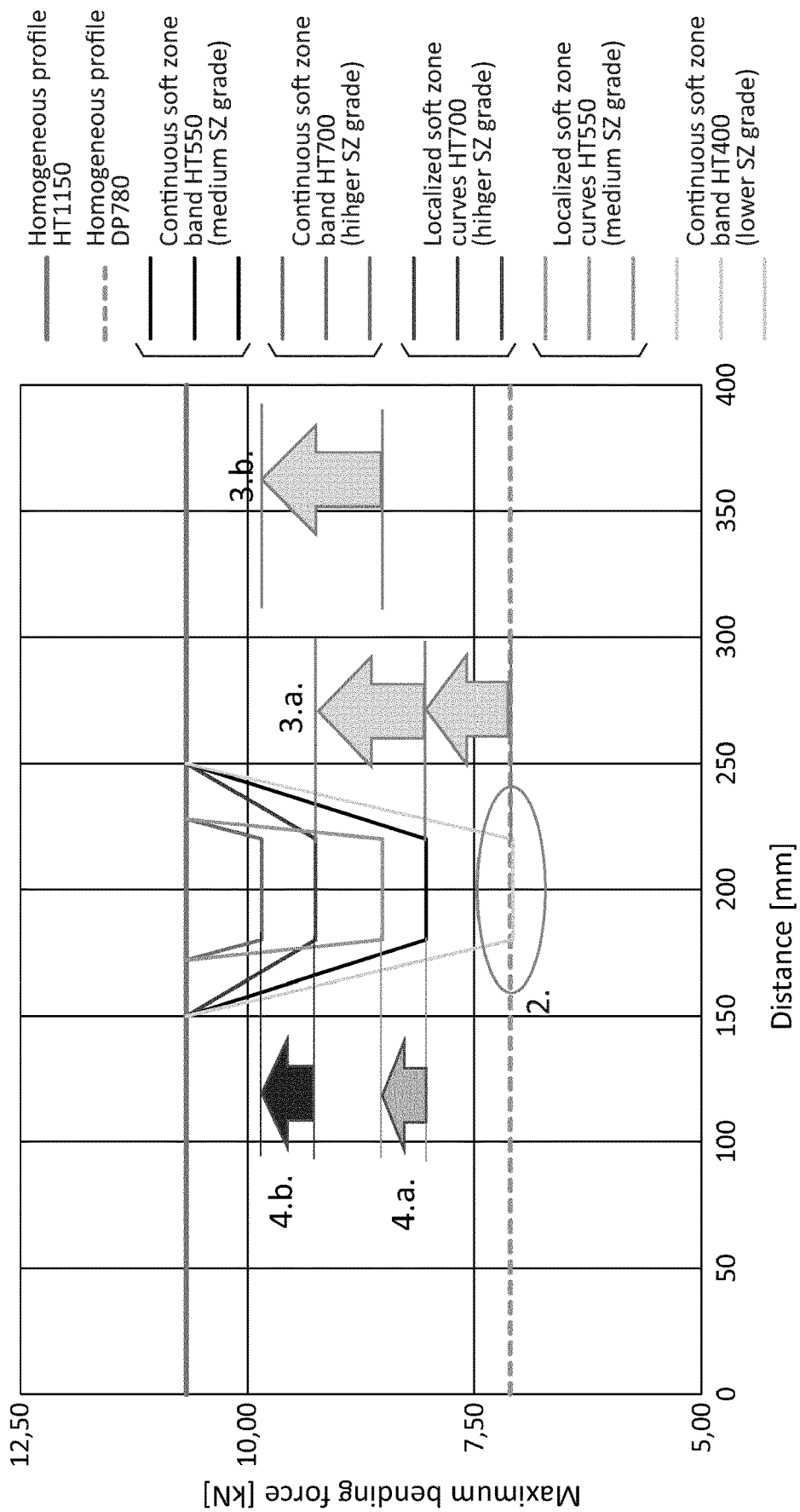
FIG. 10 is a graph representing the maximum bending force versus the longitudinal position in the profile which allows the comparison between monolithic beams, beams having a band soft zone and beams according to the disclosure, that is, having two localized soft zones.

FIG. 10 illustrates the maximum bending force in kN as a function of the position along the profile. The results shown therein correspond to the following cases:

Homogeneous Profile HT1150

This profile correspond to the prior art monolithic beam made of a homogeneous material having the higher resistance, the lower ductility. As the graph shows, it exhibits the highest maximum bending force, which leads to a localized risk of damage of 100%, which represent a crack occurrence, for the comparison with the other solutions.

Homogeneous Profile DP780

This profile correspond to the prior art monolithic beam made of a homogeneous material having the lower resistance, the higher ductility. As the graph shows, it exhibits the minimum bending force, which leads to no risk of damage represented by value of 0%, the comparison with the other solutions. When comparing with the previous case (Homogeneous profile HT1150), it can be seen, as expected, that the maximum bending force is clearly reduced. However, a solution comprising a monolithic beam wholly made of a less resistant material would lead to a weak structural B-pillar with higher cabin cell intrusions, and thus higher occupant injuries.

Continuous Soft Zone Band HT550 (Medium SZ Grade)

This profile consists in providing a continuous soft zone band having a medium resistance, that is a medium ductility. This solution yields a notable reduction in the maximum bending force, and thus in the damage risk.

Continuous Soft Zone Band HT700 (Higher SZ Grade)

This profile relates to providing a continuous soft zone band having a higher resistance, that is a lower ductility.

Continuous Soft Zone Band HT400 (Lower SZ Grade)

This profile relates to providing a continuous soft zone band having a lower resistance, that is, a higher ductility. There it can be seen that applying a continuous ductile band to a HT1150 profile reduces the damage risk to the damage risk of a homogeneous profile DP780, i.e. a profile fully made of a ductile material.

The comparison between the three tests carried on profiles having continuous ductile bands, pointed out with the arrows 3.a of FIG. 10, show that increasing the soft zone strength grade involves increasing the damage risk.

Localized Soft Zones Curves HT700 (Higher SZ Grade)

When compared with the case of a homogeneous profile HT1150, it can be seen that by only slightly softening the curved zones, there is already an important reduction in the damage risk when compared to a monolithic beam.

Localized Soft Zones Curves HT550 (Medium SZ Grade)

And then, if the localized soft zones are further softened, there is a notable further reduction of the damage risk, as pointed out with the arrow 3.b of FIG. 10.

The arrows 4.a and 4.b of FIG. 10 show that the transition from a band to a more localized soft zone slightly increases the damage risk. However, by adjusting the softening degree it is possible to reduce the damage risk to be equivalent to that of a band.

Figure 11:
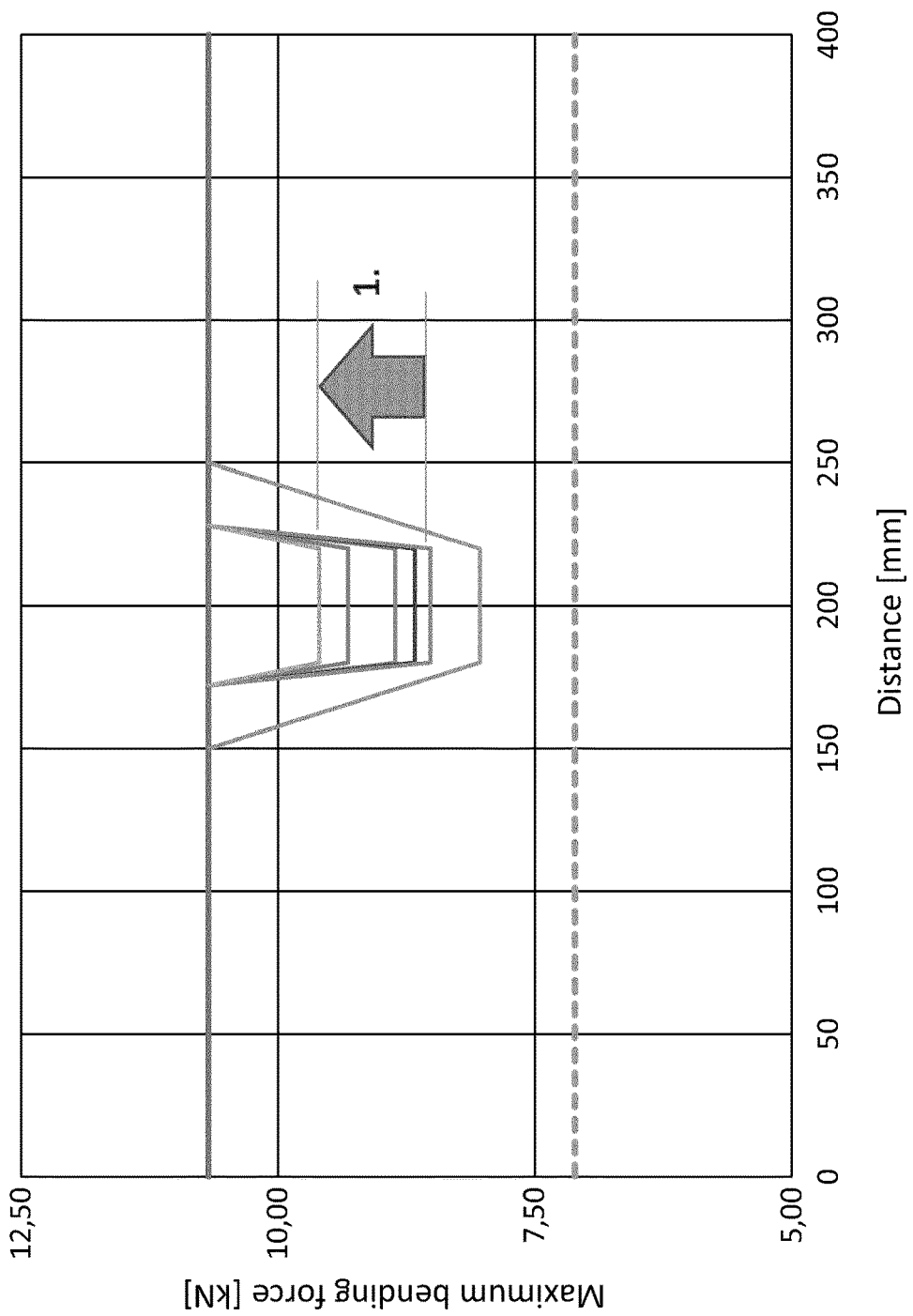
FIG. 11 is a graph representing the maximum bending force versus the longitudinal position in the profile which allows the comparison between monolithic beams (parallel upper and lower horizontal lines), beams having a band soft zone and beams according to the disclosure with varying lengths of the two localized soft zones.
Figure 14:
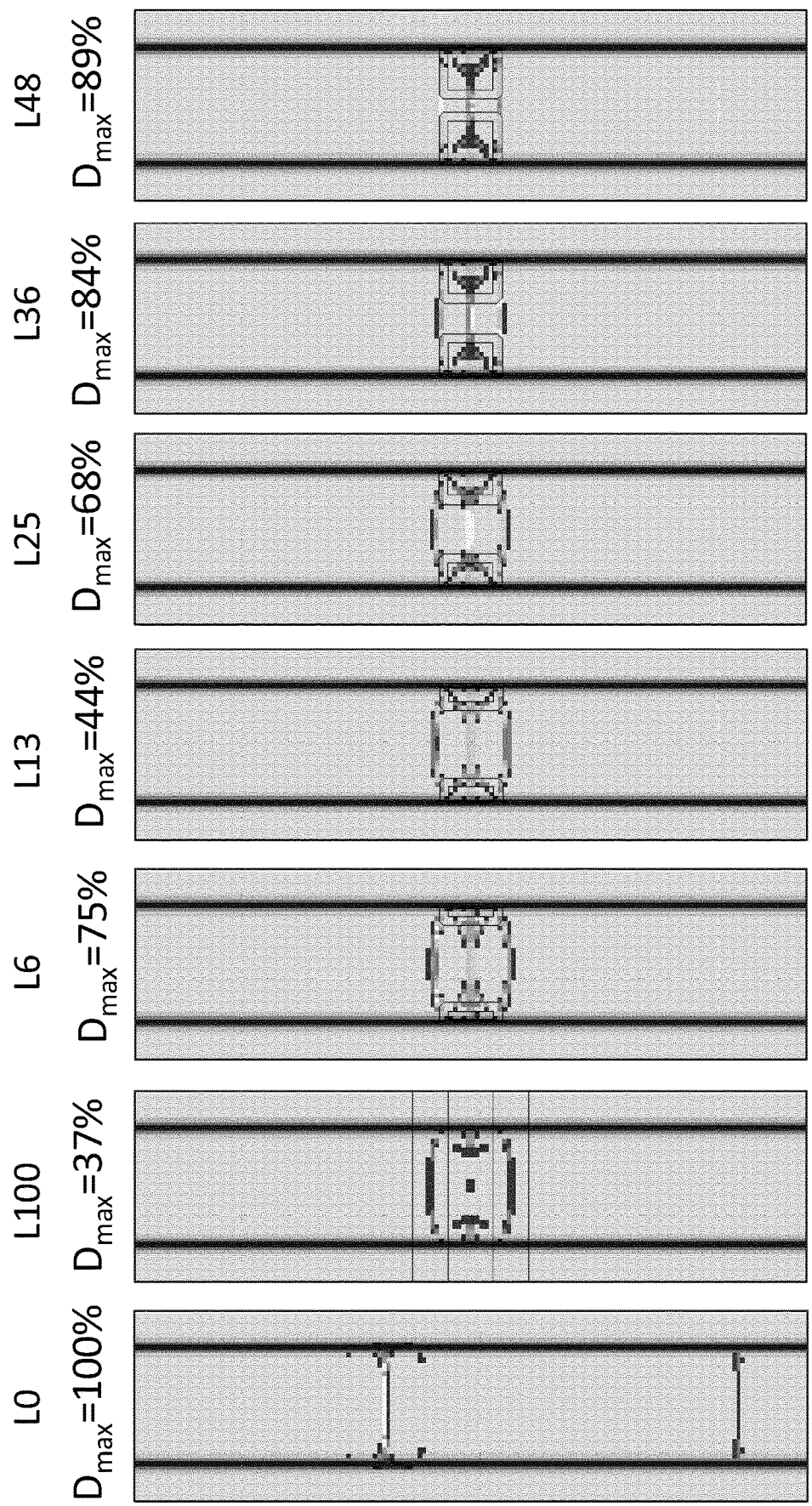
FIG. 14 shows the spatial distribution of the damage risks for a monolithic beam, a beams having a band soft zone and beams according to the disclosure with varying lengths of the two localized soft zones.

In FIG. 11, the upper (BATCH #10 1010) and lower limits (BATCH #11 1010) corresponding to monolithic beams of a material with a high and reduced strength respectively are shown again. Between those two limits the damage risks corresponding to different relative percentages of the lengths of the sections with soft zone with respect to the total length of the profile have been represented. These damage risks correspond to the points having higher damage risk in the simulation of FIG. 14.

Figure 15:
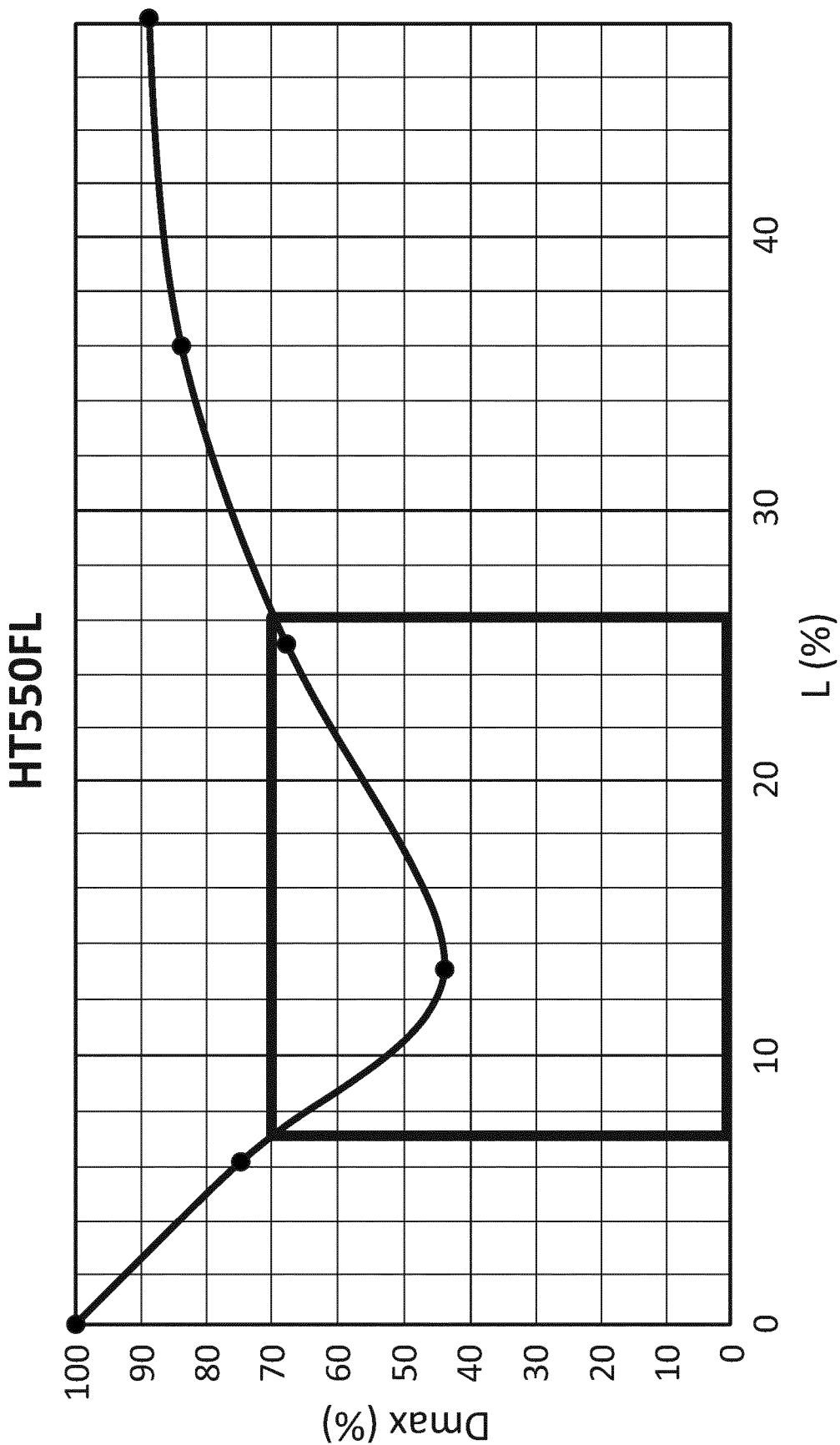
FIG. 15 shows the maximum damage risk as a function of the length percentage of the two localized soft zones, while indicating the maximum admissible damage risk and the resulting acceptable length percentage interval.
Figure 16:
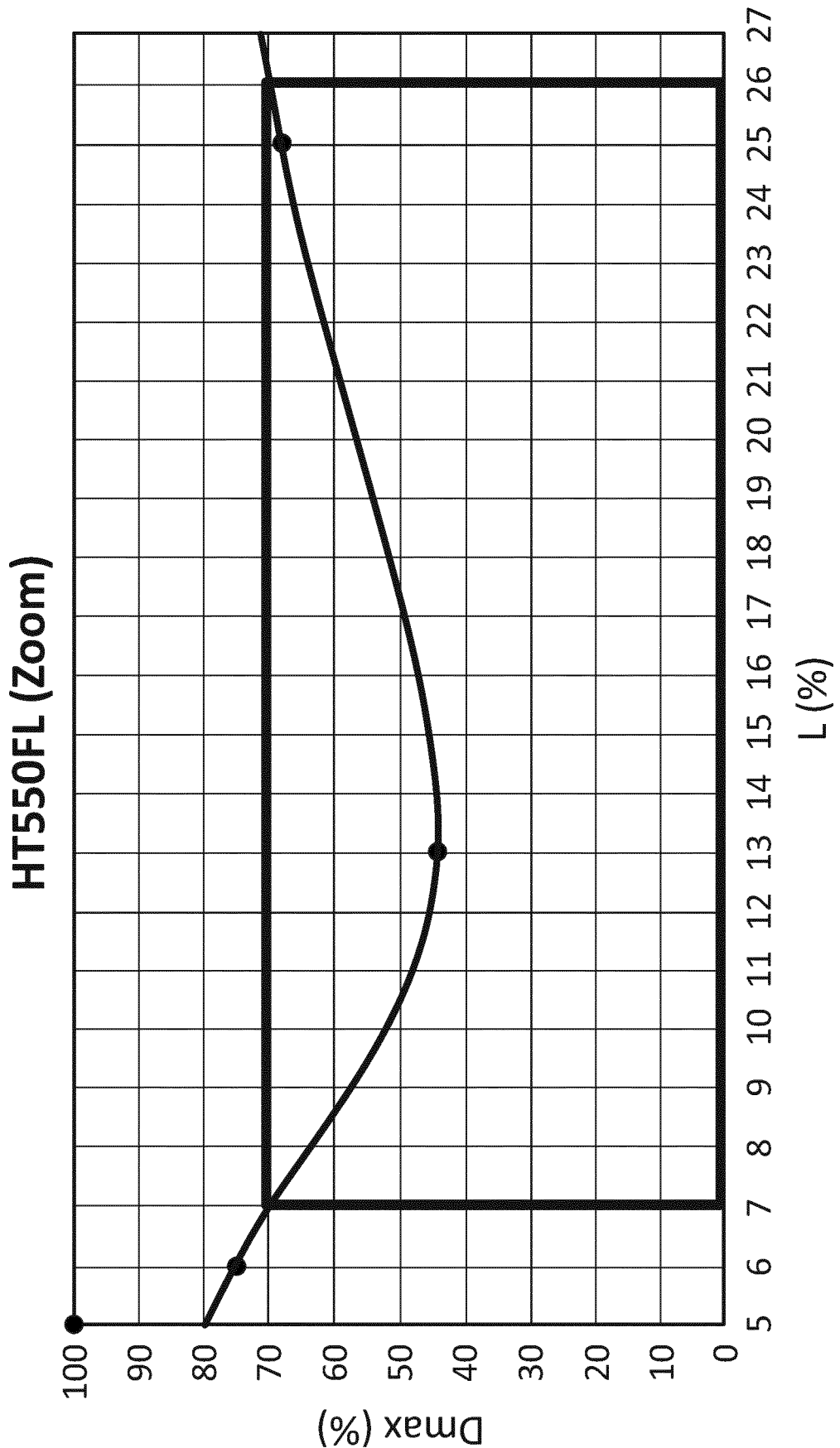
FIG. 16 is a zoom view of FIG. 15 corresponding to the acceptable length percentage interval.

These results are summarized in the graphs of FIGS. 15 and 16.

First it is concluded for the following intervals:

$$0.07 \cdot l \leq l1 + l2 \leq 0.26 \cdot l$$

$$0.03 \cdot l \leq l1$$

$$0.03 \cdot l \leq l2$$

wherein the portions sum up a cross-section length l and l1 and l2 are the length of the specific portions l1, l2, the damage risk falls below 70%.

Also it is shown that there is an optimum (minimum) value of the damage risk, which corresponds to a determined value.

Figure 7:
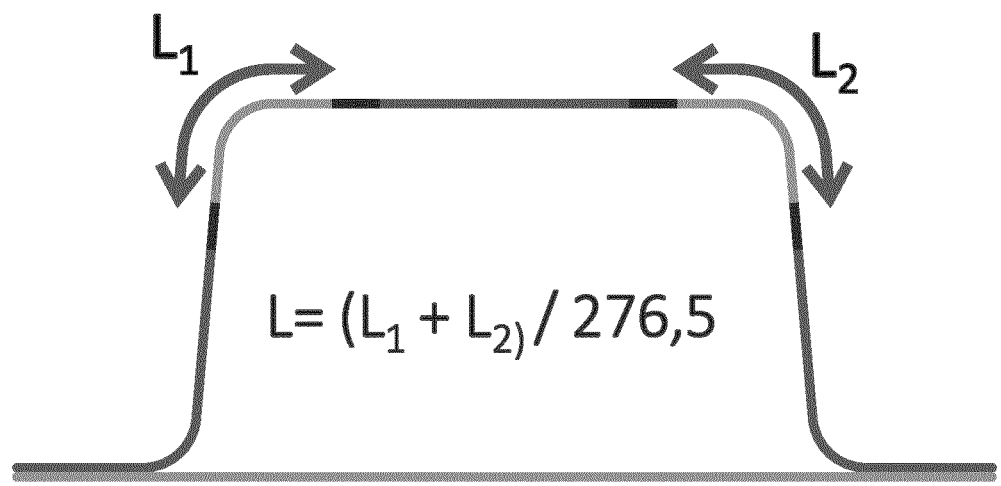
FIG. 7 shows how the length percentage has been calculated.

In particular, for the shape shown in FIG. 7, the following intervals correspond to a minimum damage risk.

$$0.12x \cdot l \leq l1 + l2 \leq 0.14 \cdot l$$

$$0.06 \leq \cdot l \leq l2$$

$$0.06 \cdot l \leq l2$$

In this text, the term "comprises" and its derivations (such as "comprising", etc.) should not be understood in an excluding sense, that is, these terms should not be interpreted as excluding the possibility that what is described and defined may include further elements.

The disclosure is obviously not limited to the specific embodiments described herein, but also encompasses any variations that may be considered by any person skilled in the art within the general scope of the disclosure as defined in the claims.

The invention claimed is:

1. A profile where a longitudinal direction, a transversal direction and a height direction are defined, the directions being perpendicular therebetween, the profile having a Ω-shaped cross-section, such that therein are defined:
    two end wing portions having substantially the transversal direction;
    two lateral wall portions having substantially the height direction;
    a frontal wall portion having substantially the transversal direction;
    two curved transition zones between the lateral wall portions and the frontal wall portion;
    two curved transition zones between the end wing portions and the lateral wall portions;
wherein a specific portion of each curved transition zones between the lateral wall portions and the frontal wall portion have a tensile strength lower than the tensile strength of the rest of the cross-section, wherein the portions sum up a cross-section length such that:

$$0.07 \cdot l \leq l1 + l2 \leq 0.26 \cdot l$$

$$0.03 \cdot l \leq l1$$

$$0.03 \cdot l \leq l2$$

l1 and l2 being the length of the specific portions.

2. The profile according to claim 1, wherein the length of the specific portions satisfy:

$$0.12 \times l \leq l1 + l2 \leq 0.14 \cdot l$$

$$0.06 \cdot l \leq l1$$

$$0.061 \cdot l \leq l2.$$

3. The profile according to claim 1, wherein the specific portions have a tensile strength lower than 800 MPa and the rest of the cross-section has a tensile strength between 950 MPa and 1200 MPa.

4. The profile according to claim 1, wherein the length of the specific portions in the longitudinal direction are comprised between 10 and 150 mm.

5. The profile according to claim 1, wherein the lower tensile strength of the specific portions is obtained with a laser treatment.

6. The profile according to claim 1, wherein the specific zones comprise more than 50% bainite and the rest of the zones comprise more than 50% martensite.

7. A longitudinal beam for a vehicle including a profile where a longitudinal direction, a transversal direction and a height direction are defined, the directions being perpendicular therebetween, the profile having a Ω-shaped cross-section, such that therein are defined:
    two end wing portions having substantially the transversal direction;
    two lateral wall portions having substantially the height direction;
    a frontal wall portion having substantially the transversal direction;
    two curved transition zones between the lateral wall portions and the frontal wall portion;
    two curved transition zones between the end wing portions and the lateral wall portions;
wherein a specific portion of each curved transition zones between the lateral wall portions and the frontal wall portion have a tensile strength lower than the tensile strength of the rest of the cross-section, wherein the portions sum up a cross-section length such that:

$$0.07 \cdot l \leq l1 + l2 \leq 0.26 \cdot l$$

$$0.03 \cdot l \leq l1$$

$$0.03 \cdot l \leq l2$$

l1 and l2 being the length of the specific portions.

8. A cross-member, pillar, B-Pillar or C-Pillar for a vehicle including a profile where a longitudinal direction, a transversal direction and a height direction are defined, the directions being perpendicular therebetween, the profile having a Ω-shaped cross-section, such that therein are defined:
    two end wing portions having substantially the transversal direction;
    two lateral wall portions having substantially the height direction;
    a frontal wall portion having substantially the transversal direction;
    two curved transition zones between the lateral wall portions and the frontal wall portion;

two curved transition zones between the end wing portions and the lateral wall portions;
wherein a specific portion of each curved transition zones between the lateral wall portions and the frontal wall portion have a tensile strength lower than the tensile strength of the rest of the cross-section, wherein the portions sum up a cross-section length such that:

$$0.07 \cdot l \leq l1 + l2 \leq 0.26 \cdot l$$

$$0.03 \cdot l \leq l1$$

$$0.03 \cdot l \leq l2$$

l1 and l2 being the length of the specific portions.

9. A B-Pillar for a vehicle comprising a profile according to claim 1, which comprises a lower end destined to be attached to a rocker and an upper end destined to be attached to an A-pillar such that a B-pillar height is defined between the lower end and the upper end, the specific portion being located in lower half of the B-Pillar.

10. The B-pillar according to claim 9, further comprising a press hardened patch.

11. A vehicle including a longitudinal beam, a Cross-member, a pillar, a B-Pillar, or a C-Pillar, the longitudinal beam, the Cross-member, the pillar, the B-Pillar, or the C-Pillar being a profile according to claim 1.

* * * * *